UNITED STATES PATENT OFFICE.

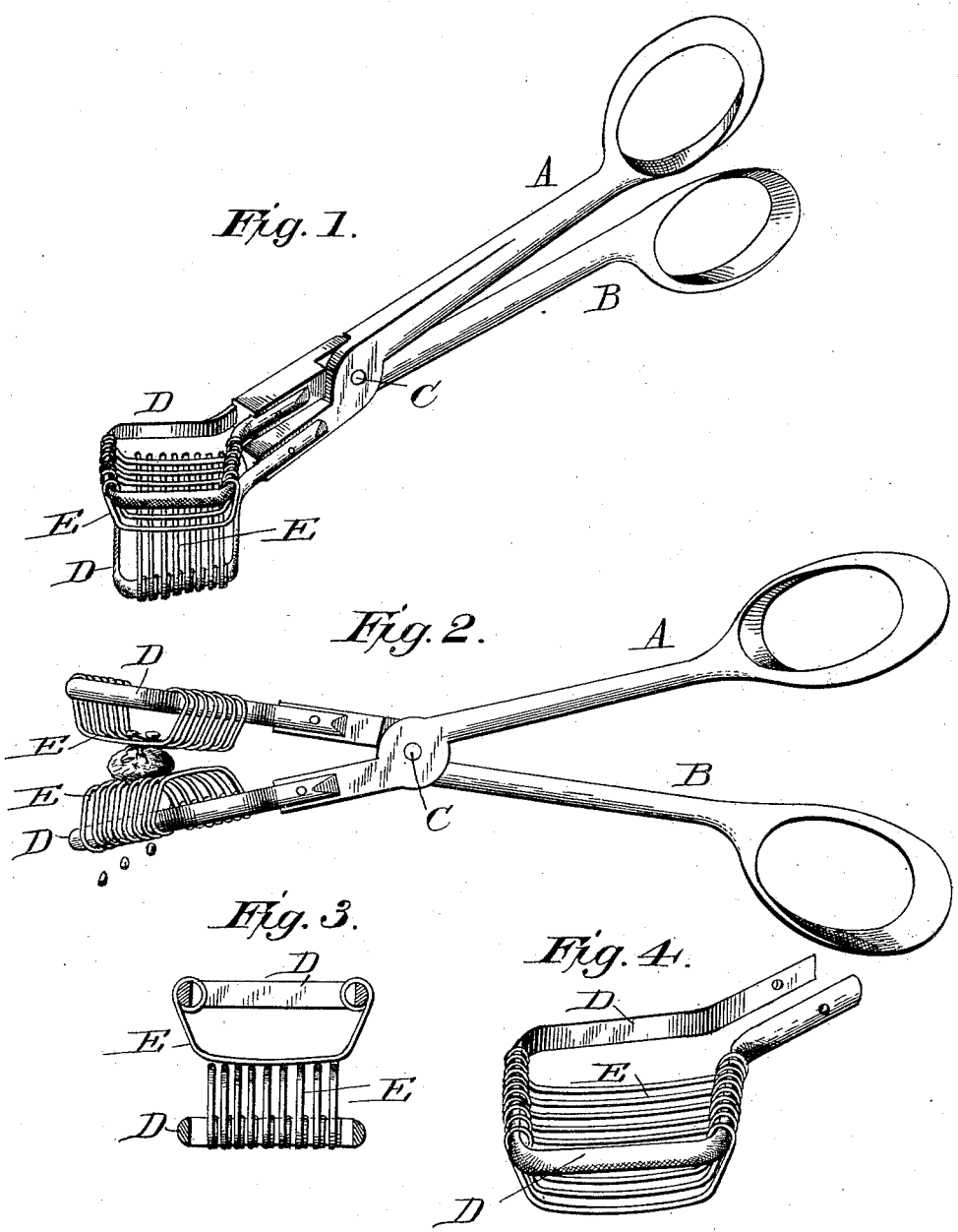

JOSEPH W. CALEF, OF NORTH EASTON, MASSACHUSETTS, ASSIGNOR OF ONE-HALF TO EDWARD R. HAYWARD, OF SAME PLACE.

DEVICE FOR SEEDING RAISINS.

SPECIFICATION forming part of Letters Patent No. 467,367, dated January 19, 1892.

Application filed April 18, 1891. Serial No. 389,432. (No model.)

*To all whom it may concern:*

Be it known that I, JOSEPH W. CALEF, a citizen of the United States, and a resident of North Easton, in the county of Bristol and State of Massachusetts, have invented certain new and useful Improvements in Devices for Seeding Raisins; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of my improved raisin-seeder. Fig. 2 is a side view of the device, showing the same as when in use with a raisin inserted between the jaws. Fig. 3 is a sectional view through the jaws on line $x\ x$ in Fig. 2, and Fig. 4 is a perspective view of one of the jaws.

Like letters of reference denote corresponding parts in all the figures.

This invention relates to devices for seeding raisins or similar small fruit of that type in which the raisin is seeded by pressing it against a set or series of ribs of wire adapted to first yield or open laterally to permit the passage of the seeds between them, and then close and prevent the withdrawal of the seed as the seeded raisin is removed; and my improvement consists in the detailed construction of the seeder, which will be hereinafter more fully described and claimed.

Referring to the drawings, the letters A and B designate the two handles of my improved raisin-seeder, which are constructed like the handles of a pair of scissors or shears and pivoted together at C. The jaws of the device consist of open frames D, preferably of square or rectangular shape, although, if desired, they may be circular, oval, or of any other desired configuration. Each of these open frames D forms the support for a series of parallel wire ribs E, arranged like the bars of a gridiron, and bent at opposite ends, where they are connected to opposite sides of the frame, as shown, so that they will form a raised platform above (or below) their appropriate supporting-frames. This raised middle part or wire platform is preferably made slightly convex to obtain a better grip or bearing against the raisin to be seeded, and the distance or open spaces between the parallel ribs should be slightly narrower than the minimum thickness of a raisin-seed. The wire of which they are made should also be sufficiently flexible to permit the ribs composing the jaws to spring apart and allow a raisin-seed to pass between them. The ribs on opposite jaws are so arranged that those of one jaw will cross those of the other approximately at right angles, both jaws being in other respects constructed exactly alike.

To use the device, the jaws are opened by forcing the handles A and B apart with the fingers of the right hand, and a raisin is inserted between the two jaws D D, as shown in Fig. 2. By now bringing the handles together the ribbed jaws will close upon and compress the raisin, when the seeds are caused by the pressure to break through the skin on opposite sides and pass between the ribs of the upper and lower jaws, the ribs yielding or springing apart to permit the passage of the seeds, and springing back into their normal position after the seeds have passed through, thereby preventing the seeds from sticking to the under side of the wire ribs.

By this device one raisin may rapidly be seeded after another without soiling the fingers, as the raisin is compressed and broken to force the seeds out between the jaws, and with a little practice the operation of seeding raisins and similar small fruit can be performed very speedily and cleanly.

Having thus described my invention, I claim and desire to secure by Letters Patent of the United States—

A raisin-seeder composed of a pair of jaws consisting of open frames crossed in opposite directions by raised ribs of wire, so that when closed the ribs of opposite jaws will cross each other approximately at right angles, said jaws being provided with handles, whereby they may be opened and closed, substantially as and for the purpose herein shown and set forth.

In testimony that I claim the foregoing as my own I have hereunto affixed my signature in presence of two witnesses.

JOSEPH W. CALEF.

Witnesses:
 H. E. LODGE,
 EDWARD R. HAYWARD.